Oct. 24, 1950 G. J. BAIR 2,526,704
METHOD OF CONDENSER ASSEMBLY
Filed March 3, 1944
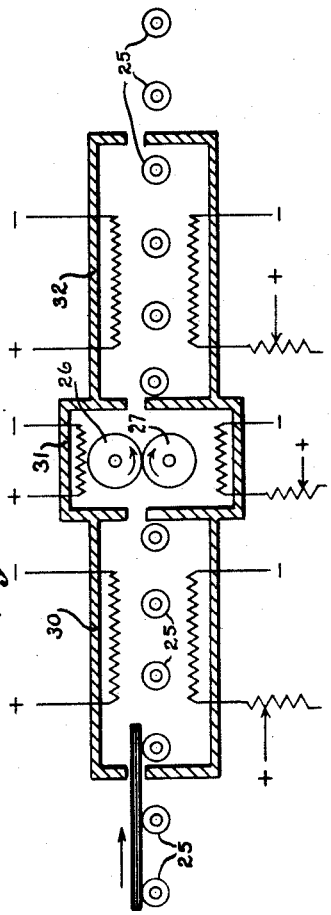
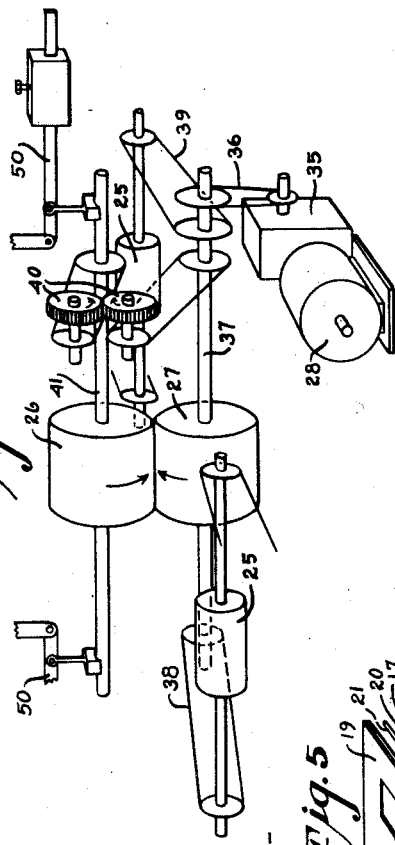
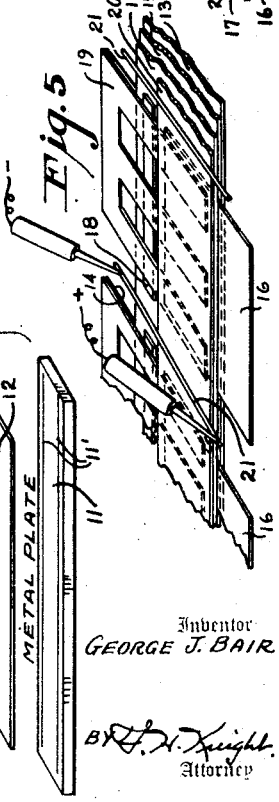
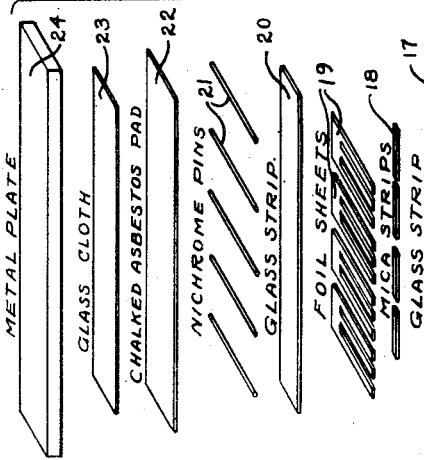
Inventor
GEORGE J. BAIR
BY F. H. Knight
Attorney Patented Oct. 24, 1950

2,526,704

UNITED STATES PATENT OFFICE 2,526,704

METHOD OF CONDENSER ASSEMBLY

George J. Bair, Corning, N. Y., assignor to Corning Glass Works, Corning, N. Y., a corporation of New York Application March 3, 1944, Serial No. 524,908

4 Claims. (Cl. 49—79)

The present invention relates to condensers and more particularly to condensers embodying a dielectric of vitreous material such as glass or the like. Although it has heretofore been proposed, from time to time, that vitreous material be employed in the manufacture of condensers, so far as applicant is aware up to the present time no vitreous dielectric condenser has been developed the various qualities of which are comparable with condensers using high grade mica as the dielectric.

The prime object of the present invention is a novel method of manufacturing condensers of the vitreous dielectric type.

A further object is a novel method of producing a condenser wherein the dielectric and metallic members may be bonded together into one coherent mass.

Other objects and features of the invention will present themselves in the course of the description which follows.

The preferred embodiment of the invention will now be described, reference being made from time to time to the accompanying drawing wherein—

Fig. 1 diagrammatically illustrates a heating and pressing apparatus by means of which certain steps of the invention may be carried out, and also shows an assembled strip of condensers embodying the invention being conveyed into the furnace;

Fig. 2 is a diagrammatic view illustrating a suitable arrangement for driving conveying and pressing rollers associated with the furnace of Fig. 1;

Fig. 3 is an exploded perspective view of an assembly embodying the invention as prepared for passage through the furnace;

Fig. 4 is an end elevation of a strip of condensers embodying the invention; and Fig. 5 is a perspective view illustrating the step of separating a strip of condensers into individual condenser units.

Referring now to Fig. 3, the assembly as prepared for passage through the conveyer furnace of Fig. 1, comprises a strip of sheet metal 11 of dimensions appreciably greater than a strip of condenser assemblies to be assembled thereon. Arranged on strip 11 is a chalked asbestos pad 12 upon which is superimposed a strip of glass film 13. Individual condenser elements or sheets 14 of metal foil are then arranged in laterally spaced relation on strip 13 with one edge of each sheet 14 set inward from the edge of strip 13 and with the opposite edge of each sheet projected well beyond the opposite edge of the strip, the latter edge of the sheet serving as one tab or terminal of a condenser assembly. A second strip of glass film 15 is then superimposed on sheets 14 and vertically aligned with strip 13. The next layer of the assembly is composed of laterally spaced metal foil sheets 16. Each sheet 16 is like sheets 14 but projects over the opposite edge of strips 13 and 15 and serves as the other tab or terminal of a condenser. A third strip of glass film 17 is then arranged over sheets 16 in vertical register with strips 13 and 15. The number of alternate layers of metal foil and glass strips employed is of course determined by the capacitance of the condensers desired. For the purpose of simplicity, a condenser strip having but three layers of metal foil has been shown.

It is often desirable to slightly reduce the capacity of a completed condenser to a predetermined standardized value. As taught and claimed in a Smith application S. N. 524,896 filed concurrently herewith now Patent No. 2,405,529, granted August 6, 1946, to enable this to be done the sheets of the final layer may be flagged and each branch of a sheet made available for separation from the sheet, thus enabling the capacity of a condenser to be reduced in one, two or more increments. To provide the foregoing feature, narrow strips 18 of mica are arranged on the glass strip 17 a small distance inward from the edge over which the final layer of metal foil sheets are to project, and serve to prevent a narrow cross-sectional area of the attached ends of the flagged sections of the final layer of foil sheets 19 from later becoming bonded to the glass strip 17. After placement of sheets 19 on strip 17 a narrow strip 20 of glass film is arranged to cover those portions of sheets 19 projecting to the left (Fig. 5) of mica strips 18.

The glass strip may be severed transversely between the individual condenser units in any conventional glass severing fashion. It is preferred, however, to employ the thermal shock severing method taught and claimed in a Smith application S. N. 524,897 filed March 3, 1944. As taught by Smith, Nichrome or similar wires 21 are arranged on glass strip 20 transverse thereto wherever it is desired to later sever the assembled strip. As illustrated, the wires 21 are arranged outside the edges of the end condenser pile-ups to trim excess end portions of the glass strips therefrom and are also arranged intermediate adjoining pile-ups to separate them from one another. Wires 21 and the underlying assembly are next covered with a chalked asbestos pad 22, which is then covered with a pad 23 of coarsely woven material such as glass or asbestos cloth or the like, and the whole covered by a sheet metal plate 24 and the assembly placed on those rollers 25 at the left end of the furnace assembly.

Rollers 25 and pressing rollers 26 and 27 are all driven by a single motor 28 as required to advance material through the furnace at a uniform predetermined speed.

Specifically, the motor 28 is coupled to a gear reduction unit 35 which, by means of a chain 36, drives pressing roller supporting shaft 37 in a clockwise direction while the rollers 25 receive their drive from shaft 37 through chains 38 and 39. Pressing roller 26 is, on the other hand, driven in a counter-clockwise direction by interposition of a pair of gears 40 in a drive between shaft 37 and shaft 41 carrying pressing roller 26.

The pressing of the assembly is essential to produce an intimate void-free bond between the metal and dielectric layers. The pressure necessary to accomplish this, of course, depends on the number of layers in the particular assembly being manufactured. The pressure applicable by rollers 26 and 27 has accordingly been made adjustable by the use of scale beam weighted levers 50 exerting downward pressure on the upper pressing roller shaft 41. The passing of the strip through a pair of pressing rollers has several advantages over a method which would involve simultaneous pressure at all points along the strip. For example, by using pressing rollers, the passage of the strips through the furnace is continuous, whereas simultaneous pressing would require the more complicated intermittent movement of the strips. Also, since the pressing rollers act only on a small fraction of the strip surface at a time, the force applied need be but a fraction of that required in simultaneous pressing and there is less tendency to fracture the glass films. Furthermore, the actual results of pressing with rollers are believed to be superior to those attainable by simultaneous pressing in that in progressive pressing air voids in the assembly are progressively squeezed out, whereas by simultaneous pressing there is grave danger of air pockets within the assembly being merely compressed. This is especially true of air pockets which lie a substantial distance inward from the lateral edges of the strip.

In some instances it may be desirable to give the condenser assemblies greater mechanical strength. This may be accomplished by substituting relatively thick strips of glass for the outer strips 13 and 20. If the outer dielectric strips are relatively thick, the method of fabrication, if desired, may be altered somewhat. For example, the sandwiching of the assembly between pads and protective metal strips can be dispensed with if suitably padded pressing rollers are substituted for rollers 26 and 27. The thickness of the outer sheets may be increased to the point where they provide a strong glass case for the finished condenser thus making it possible to dispense with the protecting casing commonly provided for mica condensers; and this glass case will have a much lower stray field loss than when a plastic or similar case is used.

The furnace proper comprises a pre-heating section 30, a heating and pressing section 31, and an annealing section 32. As diagrammatically illustrated, each of the sections 30, 31, and 32 contains a pair of electric heating elements. The electric current supplied to the elements of the respective sections of the furnace is so adjusted that the temperature distribution maintained within section 30 is such that an assembled strip of condensers attains a uniform temperature near the softening temperature of its glass strips by the time it starts entering section 31 and reaches or slightly exceeds the softening temperature just before entering pressing rollers 26 and 27. The temperature distribution of section 32 is so adjusted that the strip issues therefrom with the glass in a strain-free condition and at a temperature approaching room temperature.

The strip, after issuing from the furnace, is divided into individual condensers or into laterally spaced groups by including the pressed-in Nichrome wires 21 in an electric heating circuit as illustrated in Fig. 5, whereupon the wires are heated and severance effected by thermal shock. As separation is effected, the Nichrome wire also breaks away from the glass and may be again used.

As will be appreciated, accuracy of placing the foil sheets in exact predetermined positions in the condenser pile-ups is essential if capacitors are to be held within a predetermined narrow capacity range. With this fact in view, plate 11 may have score lines 11' to indicate to the assembler the distance inward from the glass strips at which the foil sheets are to be placed. As a further precaution against shifting of the foil sheets and glass strips, the respective strips and sheets may be temporarily glued to one another. With metal plate 11 arranged on a suitable heated hot plate, diphenyl may be used as the temporary adhesive, as it will be volatilized as the assembly passes through section 30 of the furnace. If desired, the mica strips 18 and wires 21 may also be temporarily glued to the assembly to assure their remaining in place until they are bonded by heat and pressure to the assembly. The asbestos pads 12 and 22 and the cloth 23 provide a cushioning action which compensates for slight irregularities in the glass strips of the assembly while being subjected to the pressure of rollers 26 and 27. The chalking of asbestos pads 12 and 22 prevents objectional sticking of the glass to the pads.

While the pressing of the assembly is taking place, the wires and metal foil are wet by the softened glass and become thoroughly bonded thereto. Obviously, the glass strips of the assembly at the same time become bonded to one another wherever they overlap the foil sheets and in the areas between pile-ups. It will be appreciated therefore that the strip issuing from the furnace comprises a unitary body of glass having imbedded therein and thoroughly bonded thereto the metal parts of the assembly.

As will be appreciated, the transverse flagged sections of sheets 19 arranged over the mica strips 18 do not bond to the mica. The condenser capacity, accordingly, can readily be reduced by removing one or more of the unbonded portions from a sheet 19.

What is claimed in the instant application is:

1. The method of manufacturing a condenser assembly which includes assembling a pile-up of alternate glass films and metal foil sheets, employing a volatile adhesive to temporarily hold the respective films and sheets in their assembled relation, subjecting the assembly to slight compression while moving it through an atmosphere so heated as to drive off the temporary adhesive, thereafter heating the glass to a softened condition, progressively subjecting the assembly to a relatively great compressive force sufficient to bond the films and sheets to one another and slowly cooling the assembly to below the strain temperature of the glass.

2. The method of manufacturing condensers which includes assembling laterally spaced pile-ups of metal condenser plates in vertical spaced relation alternately with strips of glass, heating the assembly to the fusion temperature of the glass while subjecting it to a compressive force to bond the plates and glass to one another, slowly lowering the temperature of the assembly to room temperature and separating the several pile-ups into separate condensers by severing the glass along lines between the respective pile-ups.

3. The method of condenser manufacture which includes piling sheets of metallic foil into laterally spaced stacks while vertically separating the sheets of the respective stacks with strips of glass, heating and pressing the whole into a dense coherent mass and separating the respective stacks from one another by fracture of the glass along lines running between stacks.

4. The method of manufacturing condensers comprising essentially alternate layers of glass and metal foil bonded to one another which comprises building up a pile of at least three strips of glass film with a row of sheets of metal foil laterally spaced from one another between the upper and intermediate strips and a similar row of sheets of metal foil between the intermediate and lower strips, heating the assembly to the softening temperature of the glass, pressing the assembly while so heated to bond the whole into a dense mass, annealing the assembly and then separating the several laterally spaced piles of metal foil sheets from one another into individual condenser assemblies by fracture of the glass along lines intermediate thereto.

GEORGE J. BAIR.

REFERENCES CITED

The following references are of record in the file of this patent:

UNITED STATES PATENTS

| Number | Name | Date |
|---|---|---|
| 595,485 | Lamb | Dec. 14, 1897 |
| 805,963 | Jackson | Nov. 28, 1905 |
| 887,598 | Delloye | May 12, 1908 |
| 1,562,533 | Weintraub | Nov. 24, 1925 |
| 1,597,953 | Byrnes | Aug. 31, 1926 |
| 1,889,881 | Thompson | Dec. 6, 1932 |
| 1,939,883 | Edwards et al. | Dec. 19, 1933 |
| 2,032,003 | Clause | Feb. 25, 1936 |
| 2,238,031 | Brennan | Apr. 15, 1941 |
| 2,257,681 | Haux | Sept. 30, 1941 |
| 2,272,119 | Jaeckel | Feb. 3, 1942 |
| 2,334,604 | Bunger | Nov. 16, 1943 |